US008266452B2

(12) United States Patent
Dunn et al.

(10) Patent No.: US 8,266,452 B2
(45) Date of Patent: Sep. 11, 2012

(54) SYSTEM AND METHOD FOR COMMUNICATING CONFIDENTIAL MESSAGES

(75) Inventors: Paul M. Dunn, Bainbridge Island, WA (US); Aaron J. Belcher, Shoreline, WA (US); Alan D. Gatzke, Bainbridge Island, WA (US)

(73) Assignee: Cisco Technology, Inc., San Jose, CA (US)

( * ) Notice: Subject to any disclaimer, the term of this patent is extended or adjusted under 35 U.S.C. 154(b) by 1439 days.

(21) Appl. No.: 11/143,240

(22) Filed: Jun. 1, 2005

(65) Prior Publication Data

US 2006/0274856 A1 Dec. 7, 2006

(51) Int. Cl.
*G06F 21/00* (2006.01)
(52) U.S. Cl. ........................................................ 713/193
(58) Field of Classification Search .................... 713/193
See application file for complete search history.

(56) References Cited

U.S. PATENT DOCUMENTS

| | | | |
|---|---|---|---|
| 5,717,742 A | 2/1998 | Hyde-Thomson | 379/88 |
| 5,838,685 A | 11/1998 | Hochman | 370/428 |
| 6,233,318 B1 | 5/2001 | Picard et al. | 379/88.17 |
| 6,700,969 B1 | 3/2004 | Shaffer et al. | 379/211.01 |
| 6,741,705 B1 | 5/2004 | Nelson et al. | 380/257 |
| 6,789,195 B1 * | 9/2004 | Prihoda et al. | 713/182 |
| 6,792,085 B1 | 9/2004 | Rigaldies et al. | 379/88.13 |
| 6,904,522 B1 * | 6/2005 | Benardeau et al. | 713/156 |
| 2003/0037261 A1 * | 2/2003 | Meffert et al. | 713/201 |
| 2003/0112930 A1 * | 6/2003 | Bosik et al. | 379/88.17 |
| 2003/0158813 A1 * | 8/2003 | Vidich et al. | 705/50 |
| 2003/0191951 A1 | 10/2003 | Cross | 713/189 |
| 2004/0205330 A1 * | 10/2004 | Godfrey et al. | 713/150 |
| 2005/0075882 A1 * | 4/2005 | Fay et al. | 704/270 |
| 2005/0097598 A1 * | 5/2005 | Pedlow et al. | 725/31 |

OTHER PUBLICATIONS

PCT Notification of Transmittal of the International Search Report and the Written Opinion of the International Searching Authority, or the Declaration with attached International Search Report and the Written Opinion in International Application No. PCT/US2006/017332 dated Aug. 5, 2006, 10 pages.

* cited by examiner

*Primary Examiner* — Jeffrey Pwu
*Assistant Examiner* — Anthony Brown
(74) *Attorney, Agent, or Firm* — Baker Botts L.L.P.

(57) ABSTRACT

A method of recording messages includes recording audio data in a first file structured in accordance with a file format that defines a first portion and a second portion. The audio data is recorded in the first portion of the first file. The method also includes encrypting the audio data stored in the first portion of the first file and generating a second file structured according to the file format. The second file includes decoy audio data in the first portion of the second file and the encrypted audio data in the second portion of the second file. The decoy audio data indicates a confidential status of the second file or serves as a red herring to distract from the encrypted audio data in the second portion of the second file.

35 Claims, 3 Drawing Sheets

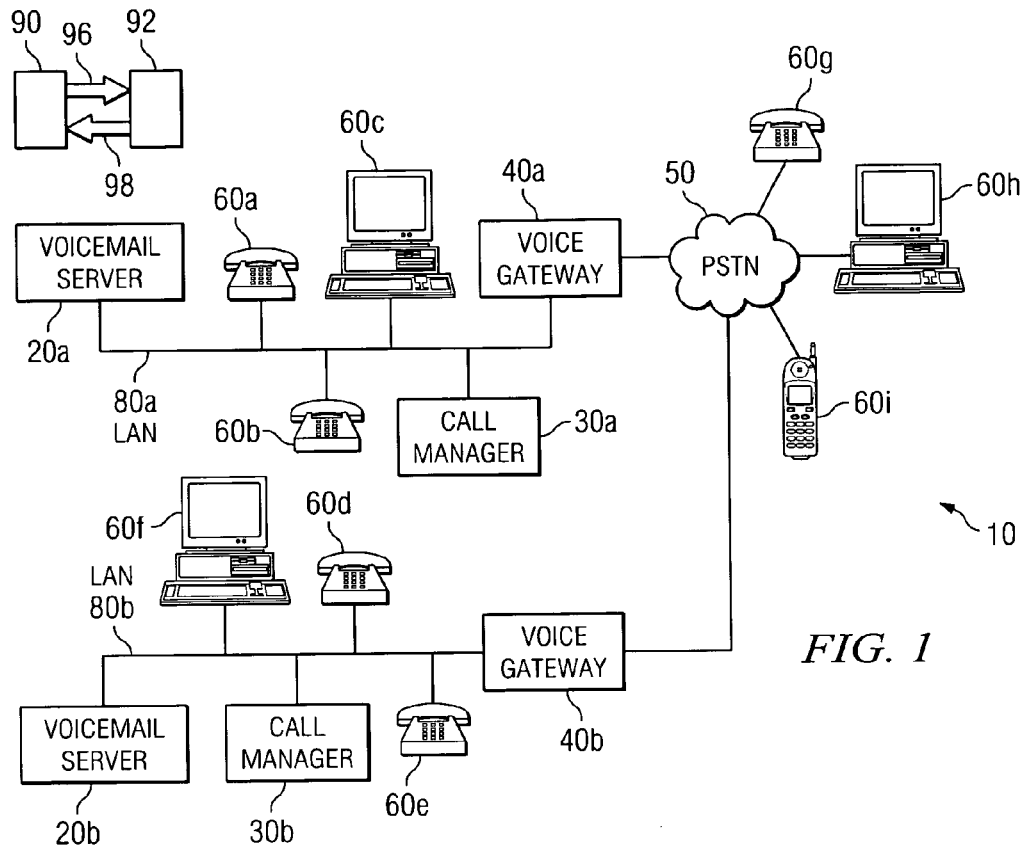
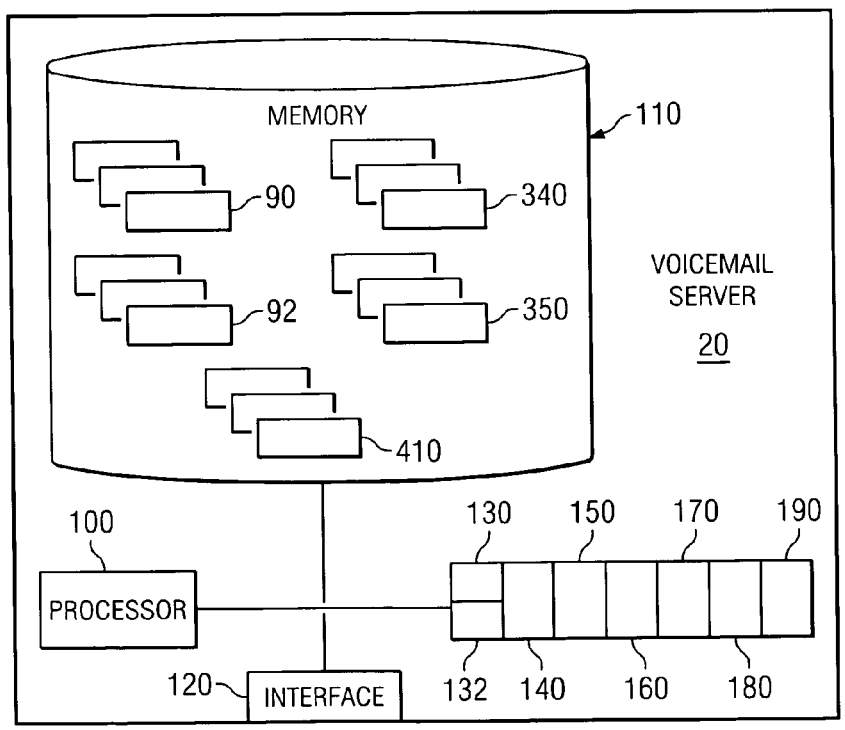
FIG. 1
FIG. 2

SYSTEM AND METHOD FOR COMMUNICATING CONFIDENTIAL MESSAGES

TECHNICAL FIELD OF THE INVENTION

This invention relates in general to communication systems, and more particularly to communicating confidential messages.

BACKGROUND OF THE INVENTION

Modern telecommunication systems provide users with a variety of features that increase convenience and ease of use. One such feature, "unified messaging," allows users to access voicemail messages using any of several different clients. As a result, a user can use email applications and web browsers to access audio files associated with voicemail recorded for that user.

This increased accessibility may however lead to security risks. Although a voicemail server may be able to monitor and regulate access to voicemail messages that are designated as confidential by the sending party, copies of such voicemail messages may be forwarded to other applications, including non-voicemail applications, that are not aware of or capable of enforcing confidentiality restrictions associated with these voicemails. As a result, unintended recipients may receive and access confidential messages diminishing the overall usefulness of the voicemail system.

SUMMARY OF THE INVENTION

In accordance with the present invention, the disadvantages and problems associated with voicemail security have been substantially reduced or eliminated. In particular, a system and method for generating and playing confidential voicemail messages is provided.

In accordance with one embodiment of the present invention, a method of recording messages includes recording audio data in a first file structured in accordance with a file format that defines a first portion and a second portion. The audio data is recorded in the first portion of the first file. The method also includes encrypting the audio data stored in the first portion of the first file and generating a second file structured according to the file format. The second file includes decoy audio data in the first portion of the second file and the encrypted audio data in the second portion of the second file.

In accordance with another embodiment of the present invention, a method of recording messages includes accessing encrypted audio data stored in a first file structured in accordance with a file format that defines a first portion and a second portion. Decoy audio data is stored in the first portion of the first file and the encrypted audio data is stored in the second portion of the first file. The method also includes decrypting the encrypted audio data and generating a second file that includes the decrypted audio data. The second file is structured according to the file format. The decrypted audio data is stored in the first portion of the second file.

Technical advantages of certain embodiments of the present invention include providing an effective technique for structuring data in a voicemail message to maintain its confidentiality. Other technical advantages of certain embodiments of the present invention include providing an efficient encryption technique that can reduce the amount of time and resources needed to encrypt confidential messages and that also provides meaningful information to unauthorized recipients attempting to access information in the confidential message.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 1 illustrates a communication system according to a particular embodiment of the present invention;

FIG. 2 illustrates a voicemail server that may be utilized in particular embodiments of the communication system;

DETAILED DESCRIPTION OF THE INVENTION

Figure 3:
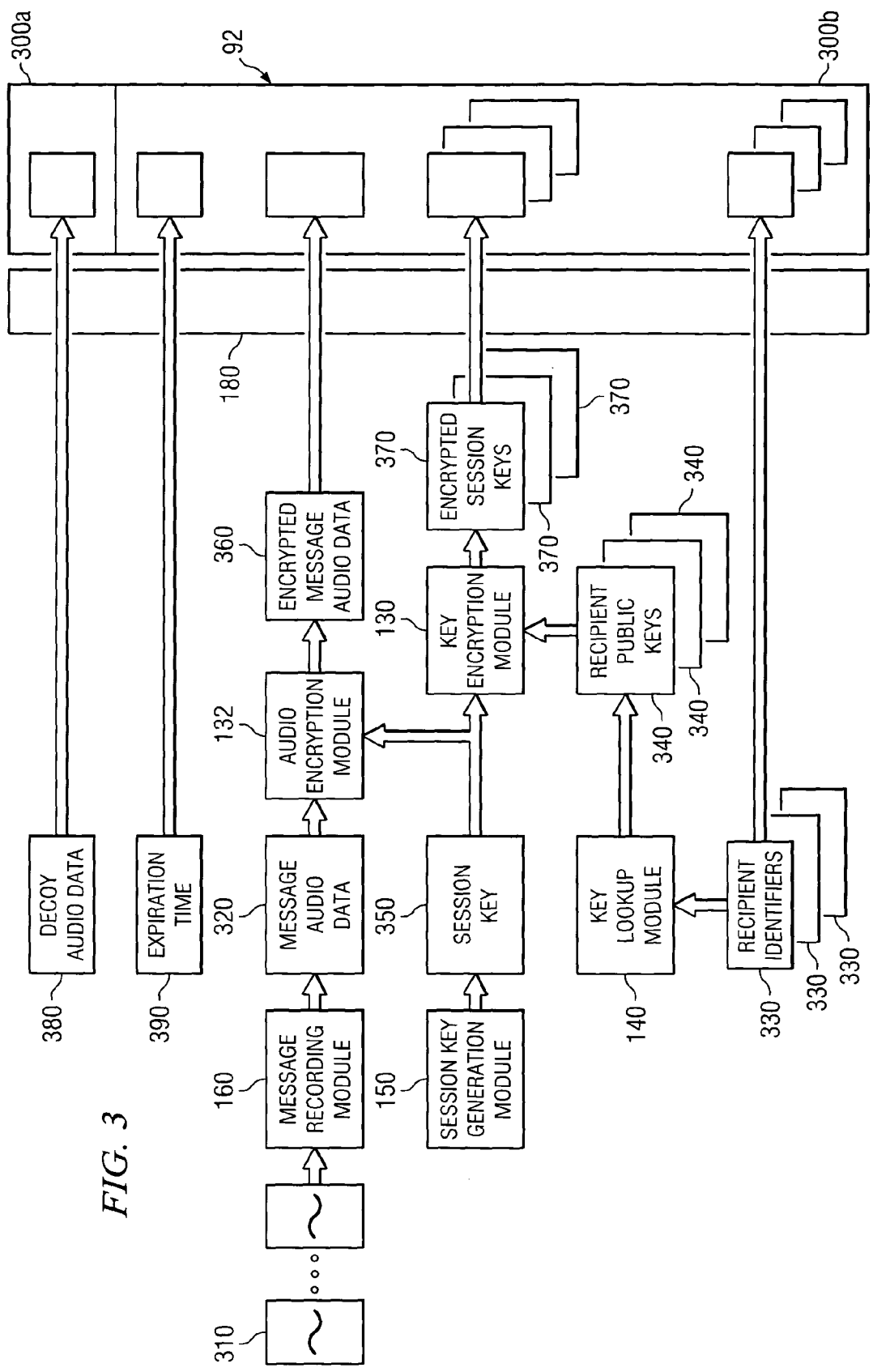
FIG. 3 illustrates an example operation of a particular embodiment of the voicemail server in encrypting voicemail messages.

FIG. 1 illustrates a communication system 10 according to a particular embodiment of the present invention. As shown, communication system 10 includes a plurality of local area networks (LANs) 80 coupled by a Public Switched Telephone Network (PSTN) 50. Each LAN 80 additionally couples a plurality of communication devices 60, a voicemail server 20, a call manager 30, and a gateway 40 to one another and to PSTN 50. Voicemail server 20 provides voicemail service for users of communication devices 60 and may utilize particular encrypting techniques that provide enhanced security for voicemail messages 90 generated by voicemail servers 20.

Communication devices 60 may each represent any suitable combination of hardware, software, and/or encoded logic to provide communication services to a user. For example, communication devices 60 may represent telephones, computers running telephony software, video monitors, cameras, or any other communication hardware, software, and/or encoded logic that supports the communication of voice, video, text or other suitable forms of data using communication system 10. In the illustrated embodiment, communication devices 60a, 60b, 60d, and 60e represent Internet Protocol (IP) telephones and communication devices 60c and 60f represent telephony-enabled personal computers (PCs). Additionally, communication device 60i represents a mobile phone coupling to communication system 10 through PSTN 50. Although FIG. 1 illustrates a particular number and configuration of communication devices 60, communication system 10 contemplates any number and arrangement of such components to support communication of media.

Gateways 40 each comprise any suitable combination of hardware and/or software that performs translation functions to facilitate seamless communication between PSTN 50 and LANs 80. These functions may include translation between transmission formats and between communication procedures. In addition, gateways 40 may also translate between audio and video CODECs and perform call setup and clearing on both the LAN side and the PSTN side. For example, gateway 40a may interface call manager 30a with PSTN 50.

As a result, when a call is placed by communication device 60g using PSTN 50, gateway 40a translates the call format associated with PSTN 50 to a call format associated with call manager 30a, such as, for example, SIP or another suitable packet-based communication protocol. Although FIG. 1 illustrates a particular embodiment of communication system 10 that includes particular types of networks, specifically LANs 80 and PSTN 50, coupling particular components of communication system 10, communication system 10 may include any appropriate types and numbers of networks.

Call managers 30 each comprise any suitable combination of hardware and/or software operable to establish a connection between a calling component of communication system 10 and a called component, such as, for example, connecting a call between communication devices 60 or between a particular communication device 60 and voicemail server 20. In a particular embodiment, call managers 30 comprise Voice Over Internet Protocol (VoIP) servers that perform the functions of signaling and session management within a packet telephony network. The signaling functionality of call managers 30 allows call information to be carried across network boundaries. The session management functionality of call managers 30 provides the ability to control the attributes of an end-to-end call across multiple networks in communication system 10. In a particular embodiment, the VoIP protocol supported by call managers 30 comprises SIP, which is a standard for multimedia conferencing over internet protocol. In this embodiment, call managers 30 comprise SIP proxy servers that handle call processing, SIP requests, and SIP responses. Although the following description of call managers 30 is detailed with respect to SIP, it should be understood that call managers 30 may support other IP telephony protocols instead, such as the H.323 protocol. In particular embodiments, call managers 30 may also provide a number of telephony services for communication devices 60 and other devices located in LAN 80, including, but not limited to, call forwarding, teleconferencing, network monitoring, and codec translation.

Voicemail servers 20 support voicemail services for users of communication devices 60. More specifically, voicemail servers 20 may generate voicemail messages, receive voicemails messages generated by other voicemail servers 20, store received or generated voicemail messages, and/or provide users access to stored voicemail messages. Voicemail servers 20 may include any appropriate combination of hardware and/or software suitable to provide the described messaging functionality. The contents of a particular embodiment of voicemail server 20 are described in greater detail below with respect to FIG. 2. Although the description below focuses on a particular embodiment of communication system 10 that supports messaging in the form of voicemail, the described messaging techniques may be utilized in a communication system that uses any form of messaging including, but not limited to, voice, video, and text. Additionally, voicemail servers 20 may be configured to operate with a variety of different types of communication devices 60. In particular embodiments of communication system 10, users may access a particular voicemail server 20 to generate or retrieve voicemail using telephones, personal computers (PCs), and/or any other appropriate types of communication devices 60. For example, in particular embodiments, users may utilize a browser running on a PC to access their voicemail account and may then play recorded voicemails on the PC.

PSTN 50 supports communication between LANs 80. Additionally, PSTN 50 may be configured to provide connections between one or more LANs 80 and communication devices 60 (such as communication devices 60g-i) that are located external to LANs 80 and that connect to communication system 10 through PSTN 50. In particular embodiments, PSTN 50 may represent all or a portion of the public switched telephone network or any other appropriate circuit-switched network. Moreover, PSTN 50 may include routers, hubs, switches, gateways, call controllers, and/or any other suitable components in any suitable form or arrangement.

LANs 80 comprise any suitable communication links that support packet-based communications. LANs 80 couple one or more communications devices 60, a call manager 30, and a voicemail server 20 to one another and to PSTN 50. LANs 80 may include bridges, switches, and/or any appropriate hardware and or software to support packet-based communication between the coupled components. Although FIG. 1 illustrates a particular embodiment of communication system 10 that includes particular types of networks, specifically LANs 80 and PSTN 50, coupling particular components of communication system 10, communication system 10 may include any appropriate types and numbers of networks.

In operation, communication system 10 provides communication services for users of communication devices 60. As part of providing these communication services, a particular voicemail server 20 generates recorded voicemail messages or receives recorded voicemail messages from other voicemail servers 20. For example, a user (referred to here as "the caller") may use communication device 60b to call another user (referred to here as "the called party") associated with communication device 60a. If the called party does not answer communication device 60, call manager 30a may forward the call to voicemail server 20a. The caller may then record a message for the called party as audio data, and voicemail server 20a may generate a voicemail message 90 that includes the recorded audio data.

In a particular embodiment of communication system 10, voicemail server 20a records voicemail message 90 in a particular audio file format. As described in greater detail with respect to FIGS. 2 and 3, this file format may include a first portion and a second portion, with particular types of information stored in each portion. For example, in particular embodiments, voicemail message 90 may represent a Resource Interchange File Format (RIFF) file, such as a WAV file, that includes a first RIFF block and one or more additional RIFF blocks. The first RIFF block may include audio data associated with the message recorded by the caller and one or more additional RIFF blocks of the WAV file may include format information and other types of information for use by WAV-file players accessing voicemail message 90. As used here, the labels "first" and "second" are intended to merely distinguish the two different portions of the voicemail message 90 and are not intended to describe the relative position of the two portions within voicemail message 90. In addition, the structure of voicemail message 90 may include more than two portions without departing from the scope of this disclosure.

Any component of communication system 10 that supports the relevant audio file format may play voicemail messages 90 once a user has retrieved voicemail messages 90 from voicemail server 20a, providing users significant flexibility in accessing and disseminating voicemail messages 90. For example, a user may access his or her voicemail accounts through web browser on a personal computer (PC) and play voicemail message 90 using appropriate software, such as a WAV-file player, running on the PC. Users may also forward voicemail messages 90 to other parties, including parties external to LAN 80, for example, as an email attachment. As noted above, this flexibility may make it difficult for voicemail server 20a to prevent unauthorized parties from playing voicemail message 90.

To prevent such unauthorized access, particular embodiments of communication system 10 may implement certain safeguards to reduce or eliminate the ability of unauthorized users to access voicemail messages 90 that the caller indicates are to remain confidential. In particular, the caller may be prompted, before or after recording voicemail message 90, to indicate whether voicemail message 90 is to remain confidential. If voicemail message 90 is not intended to remain confidential, voicemail server 20a may record voicemail message 90, as described above, and subsequently make the message available to the called party based on appropriate policies of communication system 10. For example, after voicemail message 90 has been recorded, the called party may be able to access a voicemail account of the called party and play the voicemail message. In particular embodiments of communication system 10, the called party may additionally be able to forward the non-confidential voicemail message to other users of communication system 10 without limitation and those other users may also be able to play the message.

If, instead, the caller indicates that the voicemail message 90 is to remain confidential, voicemail server 20a may encrypt voicemail message 90 generating encrypted voicemail message 92, as indicated by arrow 96 in FIG. 1. As part of generating encrypted voicemail message 92, voicemail server may restructure information included in voicemail message 90 to prevent elements of communication system 10 other than voicemail server 20a from being able to access the recorded message.

More specifically, voicemail server 20a, in particular embodiments, generates voicemail message 90 in accordance with a particular audio file format that includes at least a first portion and a second portion, such as a WAV file, as described above. As also noted above, audio data associated with the message recorded by the caller may be stored in the first portion of the voicemail message 90. If voicemail server 20a determines that voicemail message 90 is to remain confidential, voicemail server 20a may, after generating voicemail message 90, encrypt voicemail message 90 to generate an encrypted voicemail message 92, also in the audio file format. The encrypted voicemail message 92 may however include the audio data in the second portion of encrypted voicemail message 92, instead of the first portion as was the case with voicemail message 90. Voicemail server 20a may also encrypt the recorded message stored in encrypted voicemail message 92. As a result of the file structure of encrypted voicemail message 92 and the encryption of the recorded message, components that support the audio file format may not be capable of accessing confidential information stored in encrypted voicemail message 92. Additionally, voicemail server 20a may include a decoy message in the first portion of encrypted voicemail message 92. In particular embodiments, the decoy message may include audio information that is readable by components that are capable of reading files formatted according to the relevant audio file format and may explain to a party (referred to here as an "unauthorized recipient") that is not included among the original recipients of the encrypted voicemail message 92 that encrypted voicemail message 92 is a confidential message. Alternatively, decoy message may be a default message that is readable by components that are capable of reading files formatted according to the relevant audio file format and that is designed to sound like the message in a typical voicemail message thereby preventing the unauthorized recipient from learning that encrypted voicemail message 92 includes confidential information The encryption techniques utilized in particular embodiments of communication system 10 are described in greater detail below with respect to FIG. 3.

After generating and, if appropriate, encrypting voicemail message 90, voicemail server 20a may then save the generated voicemail message 90 or encrypted voicemail message 92 in a voicemail account of the called party. Voicemail server 20a may save the message 90 or 92 in the relevant voicemail account by storing the message 90 or 92 in a portion of memory associated with the account, storing a pointer to the message 90 or 92 in a portion of memory associated with the account, attaching an identifier identifying the account to the message, or associating the message 90 or 92 with the account in any other appropriate manner.

The called party may subsequently access voicemail server 20a to listen to messages 90 or 92 saved in the called party's voicemail account. After any appropriate authentication of the identity of the called party, such as the receipt and verification of a Personal Identification Number (PIN), voicemail server 20a may play the recorded message 90 or 92 to the called party. If the message 90 or 92 represents an encrypted voicemail message 92, voicemail server 20a may decrypt the encrypted voicemail message 92 to allow the called party to listen to the audio message encrypted in encrypted voicemail message 92, as indicated by arrow 98 in FIG. 1. As part of decrypting encrypted voicemail message 92, voicemail server 20a may access the recorded audio data stored in the second portion of encrypted voicemail message 92 and transmit this audio data to the called party to be played by a communication device 60 associated with the called party. If voicemail server 20 additionally encrypted the audio data stored in the second portion during encryption of encrypted voicemail message 92, voicemail server 20a may also decrypt the audio data before transmitting the audio data to the relevant communication device 60. The decryption techniques utilized in particular embodiments of communication system 10 are described in greater detail below with respect to FIG. 4.

If the called party attempts to forward an encrypted voicemail message 92, using forwarding features of voicemail server 20a itself, to an unauthorized recipient, voicemail server 20a may determine encrypted voicemail message 92 is to remain confidential and prevent the called party from forwarding voicemail message 92 to the unauthorized recipient. Furthermore, as noted above, if the called party attempts to forward encrypted voicemail message 92 to the unauthorized recipient independent of voicemail server 20a, for example, by forwarding encrypted voicemail message 92 as an email attachment, components of communication system 10 that support the audio file format of voicemail messages 90 may not be able to play the recorded message because the recorded message is stored in the second portion of encrypted voicemail message 92 and/or because the recorded message is encrypted. Such components may instead play the decoy message stored in the first portion of encrypted voicemail message 92, which may, in particular embodiments, inform the unintended recipient that he or she is unable to access the recorded message because the recorded message is confidential. In particular embodiments, the decoy message may instead include a default message that sounds like a typical voicemail message when played by components of communication system 10 that support the audio file format of voicemail messages 90.

As a result, particular embodiments of communication system 10 may reduce or eliminate the possibility that unauthorized recipients may access confidential messages without unnecessarily limiting access options for users of communication system 10. As described below, particular embodiments of voicemail servers 20 may also utilize encryption techniques that result in faster encrypting and reduced computational complexity. Furthermore, particular voicemail servers 20 may generate encrypted voicemail messages 92 that provide an explanatory message indicating the voicemail is confidential when unauthorized recipients attempt to access the encrypted voicemail message 92 independent of voicemail servers 20. As a result, particular embodiments of communication system 10 may provide a number of operational benefits. Various embodiments of communication system 10 may exhibit some, none, or all of these benefits.

FIG. 2 is a block diagram illustrating the contents of a particular embodiment of voicemail server 20. As shown in FIG. 2, voicemail server 20 includes a processor 100, a memory 110, a network interface 120, a key encryption module 130, an audio encryption module 132, a key lookup module 140, a session key generation module 150, a message recording module 160, a message playback module 170, a message forming module 180, and a message extraction module 190. Although FIG. 2 illustrates particular components that are located within a particular embodiment of voicemail server 20, any of key encryption module 130, audio encryption module 132, key lookup module 140, session key generation module 150, message recording module 160, message playback module 170, message forming module 180, and message extraction module 190 may, in alternative embodiments, represent components external to voicemail server 20.

Processor 100 may be a general purpose computer, dedicated microprocessor, or other processing device capable of communicating electronic information. Examples of processor 100 include application-specific integrated circuits (ASICs), field-programmable gate arrays (FPGAs), digital signal processors (DSPs) and any other suitable specific or general purpose processors. Memory 110 stores recorded messages 90 and 92 for users hosted by voicemail server 20, public and private keys for users hosted by voicemail server 20, code for processor 100, and/or any other appropriate information, data, or instructions used by voicemail server 20. Memory 110 may comprise any collection and arrangement of volatile or non-volatile, local or remote devices suitable for storing data such as, for example, random access memory (RAM) devices, read only memory (ROM) devices, magnetic storage devices, optical storage devices, or any other suitable data storage devices.

Network interface 120 comprises an interface operable to facilitate communication between the elements of voicemail server 20 and call manager 30, communication devices 60, and/or other components of communication system 10. In a particular embodiment, network interface 120 supports VoIP communication using the Session Initiation Protocol (SIP) to establish communication sessions between voicemail server 20 and other elements of communication system 10. Network interface 120 may include any appropriate combination of hardware and/or software suitable to provide this functionality.

Session key generation module 150 generates session keys 350 for use in encrypting the audio data of voicemail message 90. Session key generation module 150 may use any appropriate algorithms for generating the session keys 350. In particular embodiments, session key 350 generation module 150 generates, for each voicemail message 90 created by voicemail server 20, a unique session key 350 for symmetric encryption and decryption of the audio data of voicemail messages 90. Although, in FIG. 2, session keys 350 are shown, for purposes of illustration, as being stored in memory 110, session key generation module 150 may, in particular embodiments, generate and use session keys 350 as needed during operation and may be configured to dispose of session keys 350 without saving them.

Audio encryption module 132 encrypts the audio data of voicemail messages 90 and decrypts the encrypted audio data of encrypted voicemail messages 92. Audio encryption module 132 may utilize any appropriate encryption algorithms for encrypting and decrypting the audio data. In particular embodiments, audio encryption module 132 encrypts and decrypts audio data based on a symmetric encryption scheme using a session key 350 generated by session key generation module 150.

Key encryption module 130 encrypts session keys 350 and decrypts encrypted session keys 370. Key encryption module 130 may utilize any appropriate encryption algorithms for encrypting session keys 350 and decrypting encrypted session keys 370. In particular embodiments, key encryption module 130 encrypts the session key based on an asymmetric encryption scheme using public and private keys obtained by key lookup module 140. Although shown in FIG. 2 as separate elements, key encryption module 130 and audio encryption module 132 may, in particular embodiments, represent a single component or module providing the functionality of both elements.

Key lookup module 140 identifies recipient public keys 340 for recipients during encryption of voicemail messages. Additionally, key lookup module 140 identifies recipient private keys 410 for recipients while decrypting voicemail messages. In particular embodiments, key lookup module 140 accesses a database that stores recipient private keys 340 and recipient public keys 410 for users hosted by voicemail server 20 and uses an identifier associated with the caller or called party, such as the phone number of a communication device 60 associated with the relevant party, a personal identification number (PIN) of the relevant party, or any other appropriate identifier, to identify the appropriate recipient private keys 340 and recipient public keys 410. In particular embodiments, each user may be uniquely associated with a recipient private key 340 and a recipient public key 410 that are used to ensure that only that user can decrypt encrypted portions of encrypted voicemail message 92. In alternative embodiments, each voicemail server 20 may be associated with a recipient private key 340 and a recipient public key 410 that is used for all users for which that voicemail server 20 hosts voicemail accounts. As a result, the recipient private key 340 and the recipient public key 410 may be shared by all users hosted by that voicemail server 20 and voicemail servers 20 may be responsible for enforcing the confidentiality policy with respect to individual users. Additionally, although shown as a single element in the illustrated embodiment, public key lookup and private key lookup may be performed by separate elements in alternative embodiments of voicemail server 20. Moreover, as noted above, key lookup may be performed by components of communication system 10 external to voicemail server 20 such as a key server.

Message recording module 160 receives audio data from communication devices 60 and processes the audio data to generate voicemail messages 90. Message recording module 160 may receive audio data from communication devices 60 in any appropriate form. In particular embodiments, message recording module 160 receives audio data stored in VoIP packets from communication devices 60.

Message playback module 170 processes voicemail messages 90 and transmits audio data from voicemail messages 90 to communication devices 60. Message playback module 170 may transmit the audio data to communication devices 60 in any appropriate form. In particular embodiments, message playback module 170 transmits audio data to communication devices 60 in the form of VoIP packets.

Key encryption module 130, audio encryption module 132, key lookup module 140, session key generation module 150, message recording module 160, and message playback module 170 may each include any suitable combination of hardware and/or software to provide the described functionality. Furthermore, although FIG. 2 illustrates an embodiment of voicemail server 20 that includes a separate key encryption module 130, audio encryption module 132, key lookup module 140, session key generation module 150, message recording module 160, and message playback module 170, any or all of these elements may include or represent common components. In particular embodiments, key encryption module 130, audio encryption module 132, key lookup module 140, session key generation module 150, message recording module 160, and message playback module 170 all represent software processes running on processor 100.

Message forming module 180 receives information output by key lookup module 140, key encryption module 130, and audio encryption module 132, and/or additional information, such as decoy audio data 380, expiration time 390, and recipient identifiers 330, and generates messages 90 and 92 from the appropriate elements of this information. In particular embodiments, as noted above, message forming module 180 creates messages 90 and 92 that include at least a first portion and a second portion. This process is described in greater detail below with respect to FIG. 3.

Message extraction module 190 extracts various elements of information from a particular message 90 or 92 when a user accesses voicemail server 20 to listen to that message 90 or 92. Message extraction module 190 then provides these elements of information as inputs to key encryption module 130, audio encryption module 132, key lookup module 140, and/or other components of voicemail server 20. This process is described in greater detail below with respect to FIG. 4.

FIG. 3 illustrates example operation of a particular embodiment of voicemail server 20 in generating an encrypted voicemail message 92 for a caller using a communication device 60. In particular, FIG. 3 illustrates operation of an embodiment of voicemail server 20 that generates an encrypted voicemail message 92 that includes encrypted message audio data 360, encrypted session keys 370, recipient identifiers 330, decoy audio data 380, and an expiration time 390. As one example, the described embodiment of voicemail server 20 may generate encrypted voicemail message 92 as a WAV file that includes decoy audio data 380 in a first RIFF block 300*a* and encrypted message audio data 360, encrypted session keys 370, and recipient identifiers 330 in a second RIFF block 300*b*. As a result, particular embodiments of voicemail server 20 may generate encrypted voicemail message 92 in a form such that the conventional media player that is capable of playing WAV files will play decoy audio data 380, when accessing encrypted voicemail message 92, and will not be able to access encrypted message audio data 360.

In this example, message recording module 160 receives data packet 310 representing, for example, VoIP packets. Message recording module 160 generates message audio data 320 based on incoming data packets 310. As part of generating message audio data 320, voicemail server 20 may buffer, order, and/or otherwise process data stored in incoming data packets 310. After generating message audio data 320, message recording module 160 transmits message audio data 320 to audio encryption module 132.

Meanwhile, session key generation module 150 generates a session key 350. As noted above, session key generation module 150 may generate a session key 350 in any appropriate manner. In a particular embodiment, session key generation module 150 generates a random, unique key for use with public key encryption algorithms such as RSA. After generating session key 350, session key generation module 150 transmits session key 350 to audio encryption module 132 and to key encryption module 130.

Once audio encryption module 132 has received message audio data 320 and session key 350, audio encryption module 132 encrypts message audio data 320 using session key 350 to generate encrypted message audio data 360. Audio encryption module 130 may encrypt message audio data 320 using any appropriate form of encryption. In particular embodiments, audio encryption module 132 encrypts message audio data 320 using a symmetric encryption algorithm such as 3DES.

Additionally, key lookup module 140 receives one or more recipient identifiers 330 from the caller. Recipient identifiers 330 may represent phone numbers associated with recipients or any other suitable form of identifier for recipients of the encoded voicemail message 92. The caller may provide recipient identifiers 330 to key lookup module 140 in any appropriate manner. For example, in particular embodiments, the caller enters one or more phone numbers associated with the recipients using the keypad of communication device 60, and communication device 60 transmits the phone numbers to key lookup module 140.

Key lookup module 140 identifies a recipient public key 340 associated with each recipient identifier 330 received by key lookup module 140. In particular embodiments of communication system 10, each user of voicemail server 20 may be uniquely associated with a recipient public key 340. In such embodiments, key lookup module 140 may access a key database that stores public keys for all users hosted by voicemail server 20. Key lookup module 140 may use each recipient identifier 330 as an index to a record in the database that includes a recipient public key 340 associated with the same recipient as that recipient identifier 330. Alternatively, all users supported by the relevant voicemail server 20 may be associated with a common public key 340, and key lookup module 140 may access a designated location in a memory 110 to retrieve the public key 340 of that voicemail server 20.

After identifying recipient public keys 340, key lookup module 140 transmits recipient public keys 340 to key encryption module 130. Once key encryption module 130 receives session key 350 and recipient public keys 340, key encryption module 130 encrypts session key 350, creating one or more encrypted session keys 370. Key encryption module 132 may encrypt session key 350 using any appropriate form of encryption. In particular embodiments, key encryption module 132 utilizes a public key encryption algorithm such as RSA to encrypt session key 350 using the recipient public key 340 of each of the specified recipients for encrypted voicemail message 92. Message forming module 180 may then create encrypted voicemail message 92 that includes encrypted message audio data 360 and one or more encrypted session keys 370.

Message forming module 180 may also include expiration time 390 and decoy audio data 380 in encrypted voicemail message 92. More specifically, particular embodiments of communication system 10 may support expiration of encrypted voicemail message 92. In such embodiments, expiration time 390 may indicate a date and/or time at which encrypted voicemail message 92 is to expire. As described in greater detail below with respect to FIG. 4, voicemail server 20 may be configured so that voicemail server 20 will not decrypt encrypted voicemail message 92 after expiration date to ensure that encrypted voicemail message 92 can not be played by recipients after the date and/or time indicated by expiration time 390.

Decoy audio data 380 includes audio data formatted in a manner that is readable by one or more elements of communication system 10 when accessed by these elements without decrypting encrypted voicemail message 92. Because of the encryption of message audio data 320, recipients of encrypted voicemail message 92 will be unable to access the confidential message recorded in encrypted message audio data 360 without decrypting encrypted voicemail message 92. However, recipients attempting to access encrypted voicemail message 92 without decrypting encrypted voicemail message 92 may be notified of the confidential status of encrypted voicemail message 92 as a result of information stored in decoy audio data 380. This may provide a useful explanation to unauthorized recipients who might otherwise think encrypted voicemail message 92 is corrupted or that the media player has malfunctioned as a result of the its inability to properly read encrypted message audio data 360. In particular embodiments, instead of providing an indication of the confidential status of encrypted voicemail message 92, decoy audio data may comprise audio information designed to sound like a typical voicemail message. This may, as a result, conceal from unauthorized recipients the fact that confidential information is included in encrypted voicemail message 92, thereby reducing the likelihood that unintended recipients may attempt to find alternative techniques for accessing the confidential information stored in encrypted voicemail message 92.

For example, encrypted voicemail message 92 may represent a WAV file with decoy audio data 380 stored in first portion 300a, comprising the data block of the WAV file, and encrypted audio data stored in second portion 300b, comprising the format block of the WAV file. Under such circumstances, media players that access encrypted voicemail message 92, such as the PC of an unauthorized recipient who has received encrypted voicemail message 92 by email, may play decoy audio data 380. When played, decoy audio data 380 may provide an audio message such as "This voice message is confidential and can only be played by accessing the voice mail server by phone. If you received this message in error notify the sender and destroy it immediately."

After generating encrypted voicemail message 92, message forming module 180 may store encrypted voicemail message 92 in voicemail accounts of local recipients, as described above with respect to FIG. 1. Voicemail server 20 may also transmit encrypted voicemail message 92 to other voicemail servers 20 that host voicemail accounts for recipients not hosted by the voicemail server 20 that generated encrypted voicemail message 92.

As a result, voicemail server 20 may generate encrypted voicemail messages 92 that are not accessible by unauthorized recipients. Voicemail server 20 may also provide a meaningful indication to recipients improperly accessing encrypted voicemail message 92 as to why they are unable to access encrypted voicemail message 92. Thus, particular embodiments of voicemail server 20 may offer a number of operational benefits. Various embodiments of communication system 10 may exhibit some, none, or all of these benefits.

Figure 4:
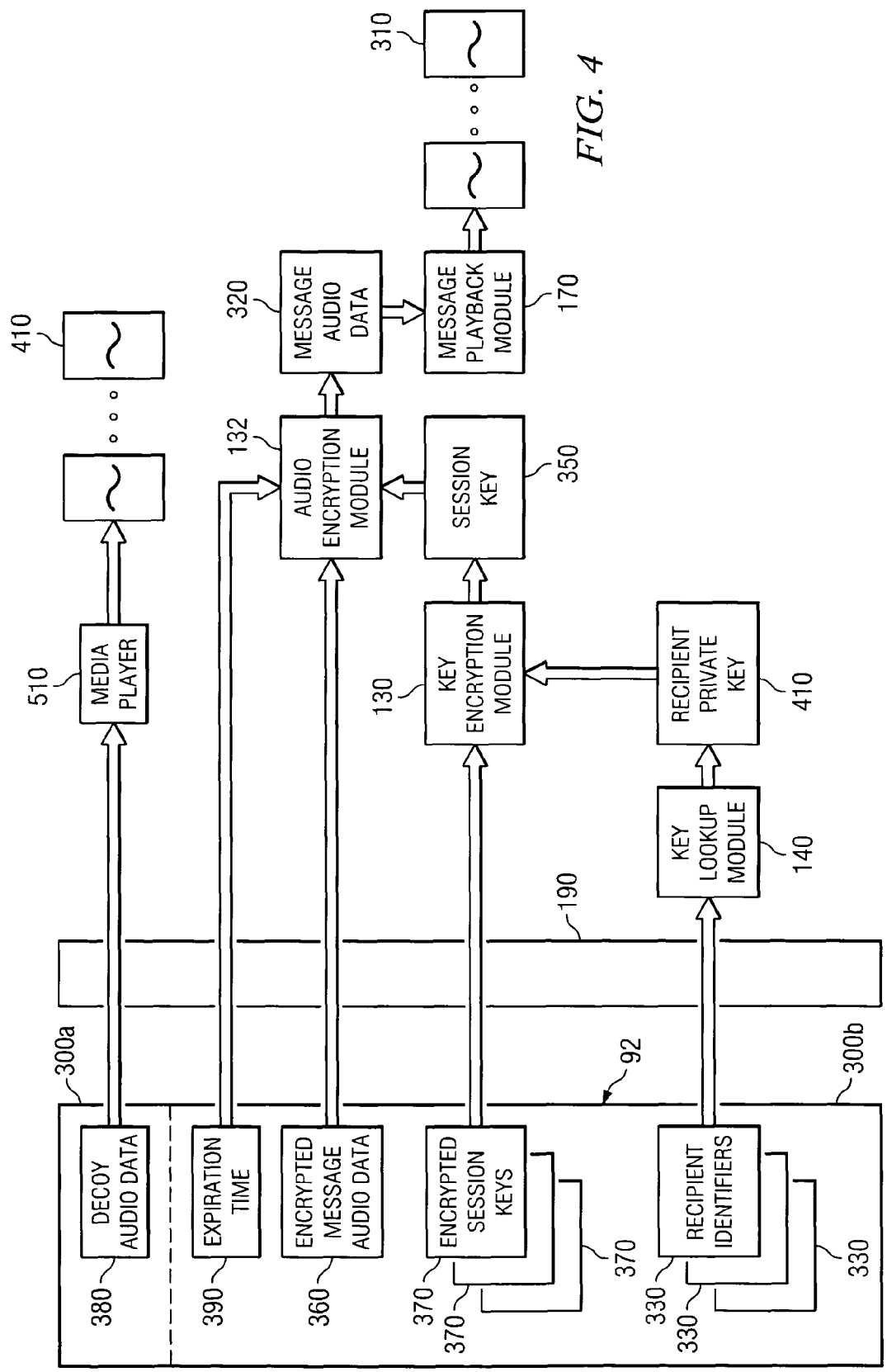
FIG. 4 illustrates an example operation of a particular embodiment of the voicemail server in decrypting encrypted voicemail messages.

FIG. 4 illustrates operation of a particular embodiment of voicemail server 20 in decrypting the audio data of encrypted voicemail message 92. In particular, FIG. 4 illustrates operation of voicemail server 20 as voicemail server 20 decrypts the example encrypted voicemail message 92 generated in FIG. 3. As noted above, the example encrypted voicemail message 92 includes encrypted message audio data 360, encrypted session keys 370, recipient identifiers 330, decoy audio data 380, and expiration time 390.

In operation, voicemail server 20 may generate encrypted voicemail message 92 or may receive encrypted voicemail message 92 from another voicemail server 20 and may store encrypted voicemail message 92 in a voicemail account of one or more recipients designated by encrypted voicemail message 92. For example, when voicemail server 20 receives encrypted voicemail message 92, voicemail server 20 may determine one or more recipients of encrypted voicemail message 92 based on one or more recipient identifiers 330 stored in encrypted voicemail message 92 and store encrypted voicemail message 92 in the voicemail accounts of those recipients. When a recipient of encrypted voicemail message 92 subsequently accesses his or her voicemail account and/or requests playback of encrypted voicemail message 92, voicemail server 20 may decrypt encrypted voicemail message 92.

As part of decrypting encrypted voicemail message 92, message extraction module 190 extracts expiration time 390, encrypted message audio data 360, encrypted session keys 370, and recipient identifier 330 as shown. Additionally, key lookup module 140 may identify a recipient private key 410 associated with the recipient. Key lookup module 140 may determine the appropriate recipient private key 410 in any suitable manner. For example, in particular embodiments, each user of communication system 10 is associated with a unique private key, and key lookup module 140 identifies the appropriate recipient private key 410 based on a recipient identifier 330 associated with the relevant recipient. For example, the recipient may transmit the recipient identifier 330 to voicemail server 20 while accessing his or her account, key lookup module 140 may identify the recipient identifier 330 based on the telephone number of the recipient, or lookup module 140 may determine the recipient identifier 330 in any other appropriate manner.

In alternative embodiments, voicemail server 20 may itself be assigned a private key and each user supported by voicemail server 20 may be associated with this common private key. In such embodiments, the public/private key encoding may be used to ensure that encrypted voicemail message 92 is only decrypted by components that enforce confidentiality policies. Then, once an appropriate device decrypts encrypted voicemail message 92, that device may be responsible for enforcing the confidentiality policy. As a result, such embodiments may reduce the time and computational complexity required to encrypt the relevant portions of encrypted voicemail message 92 as the process may not have to be repeated for multiple users hosted by the same voicemail server 20. Additionally, such embodiments may dramatically reduce the number of private/public key pairs that are generated and maintained.

After identifying the appropriate recipient private key 410, key lookup module 140 transmits recipient private key 410 to key encryption module 130. Using the identified recipient private key 410, key encryption module 130 then decrypts a particular session key 350 stored in encrypted voicemail message 92. For example, in particular embodiments, voicemail server 20 matches the recipient identifier associated with the recipient retrieving encrypted voicemail message 92 to one of the recipient identifiers 330 stored in encrypted voicemail message 92. Voicemail server 20 then identifies an encrypted session key 370 associated with the matched recipient identifier 330 and decrypts that encrypted session key 370.

After key encryption module 130 decrypts session key 350, audio encryption module 132 decrypts encrypted audio data using session key 350 to restore message audio data 320. Audio encryption module 132 may then transmit message audio data 320 to message playback module 170. Message playback module 170 generates data packets 310 based on message audio data 320 and transmits audio data packets 310 to the communication device 60 through which the recipient is accessing voicemail server 20. Message playback module 170 may transmit any appropriate form of audio data packets 310 to the recipient. In particular embodiments, message playback module 170 transmits VoIP packets to the recipient.

Additionally, particular embodiments of voicemail server 20 may support expiration of voicemail messages. In such embodiments, voicemail server 20 may use expiration time 390 stored in encrypted voicemail message 92 to determine whether encrypted voicemail message 92 has expired. If voicemail server 20 determines that encrypted voicemail message 92 has expired, voicemail server 20 may deny recipient's request to play encrypted voicemail message 92, play decoy audio data 380 to the recipient, and/or take any other appropriate action depending on the configuration of voicemail server 20.

Furthermore, as noted above, if a recipient attempts to access encrypted voicemail message 92 without the use of voicemail server 20, but using an element of communication system 10 that supports the audio file format, such as a conventional media player 510 capable of playing WAV files, the recipient will hear the message recorded in decoy audio data 380 because decoy audio data 380 is stored in the first portion where components that support the audio file format expect to find audio data. As a result, the recipient may be able to determine why he or she is unable to listen to the message. Consequently, voicemail server 20 may generate encrypted voicemail message 92 that can provide meaningful information even when accessed independently of voicemail server 20.

Thus, voicemail server 20 provides an effective technique for communicating confidential messages within a voicemail system. Additionally, particular embodiments of voicemail server 20 may be configured to generate encrypted voicemail message 92 that can be recognized by and provide meaningful information to components and/or users of communication system 10 that are not authorized to access the confidential message. Additionally, particular embodiments of voicemail server 20 utilize encryption techniques that limit the time and computational resources required to encrypt and decrypt encrypted voicemail messages 92. As a result, particular embodiments of voicemail server 20 may provide multiple operational benefits. Various embodiments of communication system 10 may exhibit some, none, or all of these benefits.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of recording messages comprising:
    recording, with a processor, audio data associated with a call in a first file structured in accordance with a file format that defines a first portion and a second portion, wherein the audio data is recorded in the first portion of the first file;
    receiving one or more recipient identifiers from a caller associated with the call, the recipient identifiers identifying one or more recipients of the audio data;
    identifying, based on the one or more recipient identifiers received from the caller, one or more public keys associated with the one or more recipients of the audio data;
    encrypting, with the processor, the audio data stored in the first portion of the first file based on the identified one or more public keys; and
    generating, with the processor, a second file structured according to the file format that includes decoy audio data in the first portion of the second file and the encrypted audio data in the second portion of the second file, wherein the decoy audio data indicates a confidential status of the second file.

2. The method of claim 1, wherein the decoy audio data is readable by media players operable to read files formatted according to the file format.

3. The method of claim 1, wherein generating the second file comprises generating a second file that includes decoy audio data in the first portion, wherein the decoy audio data is associated with a recorded message that indicates the confidential status of the second file when read by a media player operable to read files structured in accordance with the file format.

4. The method of claim 1, wherein encrypting the audio data comprises:
    encrypting the audio data using a session key; and
    encrypting the session key using the one or more identified public keys; and wherein generating the second file comprises generating a second file that includes the encrypted session key.

5. The method of claim 1,
    wherein encrypting the audio data comprises:
    encrypting the audio data using a session key; and
    encrypting a copy of the session key using each of the one or more identified public keys; and wherein generating the second file comprises generating a second file that includes each of the encrypted session keys.

6. The method of claim 1, wherein recording the audio data in a first file structured in accordance with a file format comprises recording the audio data in a RIFF file.

7. The method of claim 1, further comprising transmitting the second file to a voicemail server associated with a recipient of the audio data.

8. The method of claim 1, further comprising storing the second file and associating the second file with a voicemail account associated with an intended recipient of the audio data.

9. The method of claim 1, wherein recording the audio data comprises:
    receiving a plurality of packets comprising audio data associated with audio signals; and
    ordering the packets;
    storing audio data from the ordered packets in the first portion of the first file.

10. A method of recording messages comprising:
    accessing, with a processor, encrypted audio data associated with a call and stored in a first file structured in accordance with a file format that defines a first portion and a second portion, the encrypted audio data encrypted with one or more public keys identified based on one or more recipient identifiers, the recipient identifiers received from a caller associated with the audio data and identifying one or more recipients of the call, wherein decoy audio data is stored in the first portion of the first file and the encrypted audio data is stored in the second portion of the first file, the decoy audio data indicating a confidential status of the second file;

decrypting, with the processor, the encrypted audio data; and generating, with the processor, a second file that includes the decrypted audio data, wherein the second file is structured according to the file format, and wherein the decrypted audio data is stored in the first portion of the second file.

11. The method of claim 10, wherein the decoy audio data is readable by media players operable to read files formatted according to the file format.

12. The method of claim 10, wherein the first file includes an encrypted session key and wherein decrypting the audio data comprises:
identifying a private key associated with a recipient of the audio data;
decrypting the encrypted session key using the identified private key; and
decrypting the audio data stored in the second portion using the decrypted session key.

13. The method of claim 10, wherein accessing the encrypted audio data stored in the first file comprises accessing encrypted audio data stored in a WAV file, and wherein the first portion comprises a first Resource Interchange File Format (RIFF) block and the second portion comprises at least one additional RIFF block.

14. The method of claim 10, wherein accessing the first file comprises receiving the first file.

15. The method of claim 10, further comprising storing the second file in a voicemail account associated with an intended recipient of the audio data.

16. The method of claim 10, wherein recording the message comprises:
receiving a plurality of packets comprising information associated with audio signals;
ordering the packets; and
storing the ordered packets in the first portion of the first file.

17. A device for recording messages comprising:
a memory operable to store processor instructions; and
a processor operable to:
record audio data associated with a call in a first file structured in accordance with a file format that defines a first portion and a second portion, wherein the audio data is recorded in the first portion of the first file;
receive one or more recipient identifiers from a caller associated with the call, the recipient identifiers identifying one or more recipients of the audio data;
identify, based on the one or more recipient identifiers received from the caller, one or more public keys associated with the one or more recipients of the audio data;
encrypt the audio data stored in the first portion of the first file based on the identified one or more public keys; and
generate a second file structured according to the file format that includes decoy audio data in the first portion of the second file and the encrypted audio data in the second portion of the second file, the decoy audio data indicating a confidential status of the second file.

18. The device of claim 17, wherein the decoy audio data is readable by media players operable to read files formatted according to the file format.

19. The device of claim 17, wherein the processor is operable to generate a second file that includes decoy audio data that is associated with a recorded message, the recorded message indicating the confidential status of the second file when read by a media player operable to read files structured in accordance with the file format.

20. The device of claim 17, wherein the processor is operable to encrypt the audio data by:
encrypting the audio data using a session key; and
encrypting the session key using the one or more identified public keys; and wherein generating the second file comprises generating a second file that includes the encrypted session key.

21. The device of claim 17,
wherein the processor is operable to encrypt the audio data by:
encrypting the audio data using a session key; and
encrypting a copy of the session key using each of the one or more identified public keys; and wherein generating the second file comprises generating a second file that includes each of the encrypted session keys.

22. The device of claim 17, wherein the processor is operable to record the audio data in a first file structured in accordance with a file format by recording the audio data in a RIFF file.

23. The device of claim 17, wherein the processor is further operable to transmit the second file to a voicemail server associated with a recipient of the audio data.

24. The device of claim 17, wherein the processor is further operable to store the second file in the memory and to associate the second file with a voicemail account associated with an intended recipient of the audio data.

25. The device of claim 17, wherein the processor is operable to record the audio data by:
receiving a plurality of packets comprising audio data associated with audio signals; and
ordering the packets;
storing audio data from the ordered packets in the first portion of the first file.

26. A device for recording messages comprising:
a memory operable to store processor instructions; and
a processor operable to:
access encrypted audio data associated with a call and stored in a first file structured in accordance with a file format that defines a first portion and a second portion, the encrypted audio data encrypted with one or more public keys identified based on one or more recipient identifiers, the recipient identifiers received from a caller associated with the audio data and identifying one or more recipients of the call, wherein decoy audio data is stored in the first portion of the first file and the encrypted audio data is stored in the second portion of the first file, and wherein the decoy audio data indicates a confidential status of the first file;
decrypt the encrypted audio data; and
generate a second file that includes the decrypted audio data, wherein the second file is structured according to the file format, and wherein the decrypted audio data is stored in the first portion of the second file.

27. The device of claim 26, wherein the first file includes an encrypted session key and wherein the processor is operable to decrypt the audio data by:
identifying a private key associated with a recipient of the audio data;
decrypting the encrypted session key using the identified private key; and
decrypting the audio data stored in the second portion using the decrypted session key.

28. The device of claim 26, wherein the processor is operable to access the encrypted audio data stored in the first file structured by accessing encrypted audio data stored in a WAV file, and wherein the first portion comprises a first Resource Interchange File Format (RIFF) block and the second portion comprises at least one additional RIFF block.

29. The device of claim 26, wherein the processor is operable to access the first file by receiving the first file.

30. The device of claim 26, the processor is further operable to store the second file in a voicemail account associated with an intended recipient of the audio data.

31. The device of claim 26, wherein the processor is operable to record the message by:
   receiving a plurality of packets comprising information associated with audio signals;
   ordering the packets; and
   storing the ordered packets in the first portion of the first file.

32. A system for recording messages comprising:
   means for recording audio data associated with a call in a first file structured in accordance with a file format that defines a first portion and a second portion, wherein the audio data is recorded in the first portion of the first file;
   means for receiving one or more recipient identifiers from a caller associated with the call, the recipient identifiers identifying one or more recipients of the audio data;
   means for identifying, based on the one or more recipient identifiers received from the caller, one or more public keys associated with the one or more recipients of the audio data;
   means for encrypting the audio data stored in the first portion of the first file based on the identified one or more public keys; and
   means for generating a second file structured according to the file format that includes decoy audio data in the first portion of the second file and the encrypted audio data in the second portion of the second file, the decoy audio data indicating a confidential status of the second file.

33. A system for recording messages comprising:
   means for accessing encrypted audio data associated with a call and stored in a first file structured in accordance with a file format that defines a first portion and a second portion, wherein decoy audio data is stored in the first portion of the first file and the encrypted audio data is stored in the second portion of the first file, the encrypted audio data encrypted with one or more public keys identified based on one or more recipient identifiers, the recipient identifiers received from a caller associated with the audio data and identifying one or more recipients of the call, the decoy audio data indicating a confidential status of the first file;
   means for decrypting the encrypted audio data; and
   means for generating a second file that includes the decrypted audio data, wherein the second file is structured according to the file format, and wherein the decrypted audio data is stored in the first portion of the second file.

34. The method of claim 1, wherein the decoy audio data indicates a confidential status of the second file by indicating to a party that is not included among a selected one or more recipients of the second file that the second file is a confidential message.

35. The method of claim 1, wherein the decoy audio data is designed to sound like a voicemail message.

\* \* \* \* \*